United States Patent [19]
Yamaguchi et al.

[11] Patent Number: 5,515,418
[45] Date of Patent: May 7, 1996

[54] AUTOMATIC CIRCUIT BACK-UP SYSTEM

[75] Inventors: Yasuhiro Yamaguchi, Tokyo; Yukako Totsuka, Kakegawa, both of Japan

[73] Assignee: NEC Corporation, Tokyo, Japan

[21] Appl. No.: 52,996

[22] Filed: Apr. 27, 1993

[30] Foreign Application Priority Data

Apr. 27, 1992 [JP] Japan .................. 4-107686

[51] Int. Cl.$^6$ .................. H04M 1/24; H04M 3/08; H04M 3/22; H04M 7/00
[52] U.S. Cl. .................. 379/34; 379/32; 379/22; 379/12; 379/221; 370/13; 370/16
[58] Field of Search .................. 379/133, 1, 2, 379/32, 34, 221, 229; 370/16, 13, 60, 94.1

[56] References Cited

U.S. PATENT DOCUMENTS

| | | | |
|---|---|---|---|
| 4,071,700 | 1/1978 | Huffman et al. | 370/16 |
| 5,138,609 | 8/1992 | Hashimoto | 370/16 |
| 5,146,474 | 9/1992 | Nagler et al. | 370/16 X |
| 5,193,086 | 3/1993 | Satomi et al. | 370/16 |
| 5,210,740 | 5/1993 | Anzai et al. | 379/221 |

*Primary Examiner*—Stephen Chin
*Assistant Examiner*—Paul Loomis
*Attorney, Agent, or Firm*—Sughrue, Mion, Zinn, MacPeak & Seas

[57] ABSTRACT

An automatic circuit back-up system is adapted to a data communication system including a private communication line for data communication and a back-up communication circuit for providing a back-up for the private communication circuit. The automatic circuit back-up system includes a periodic message transmitting circuit for transmitting a periodic message at a predetermined regular period to a distant office through the back-up communication circuit, and a monitoring circuit for monitoring whether the periodic message transmitted from the distant office via the back-up communication circuit is received at the predetermined regular period.

8 Claims, 3 Drawing Sheets

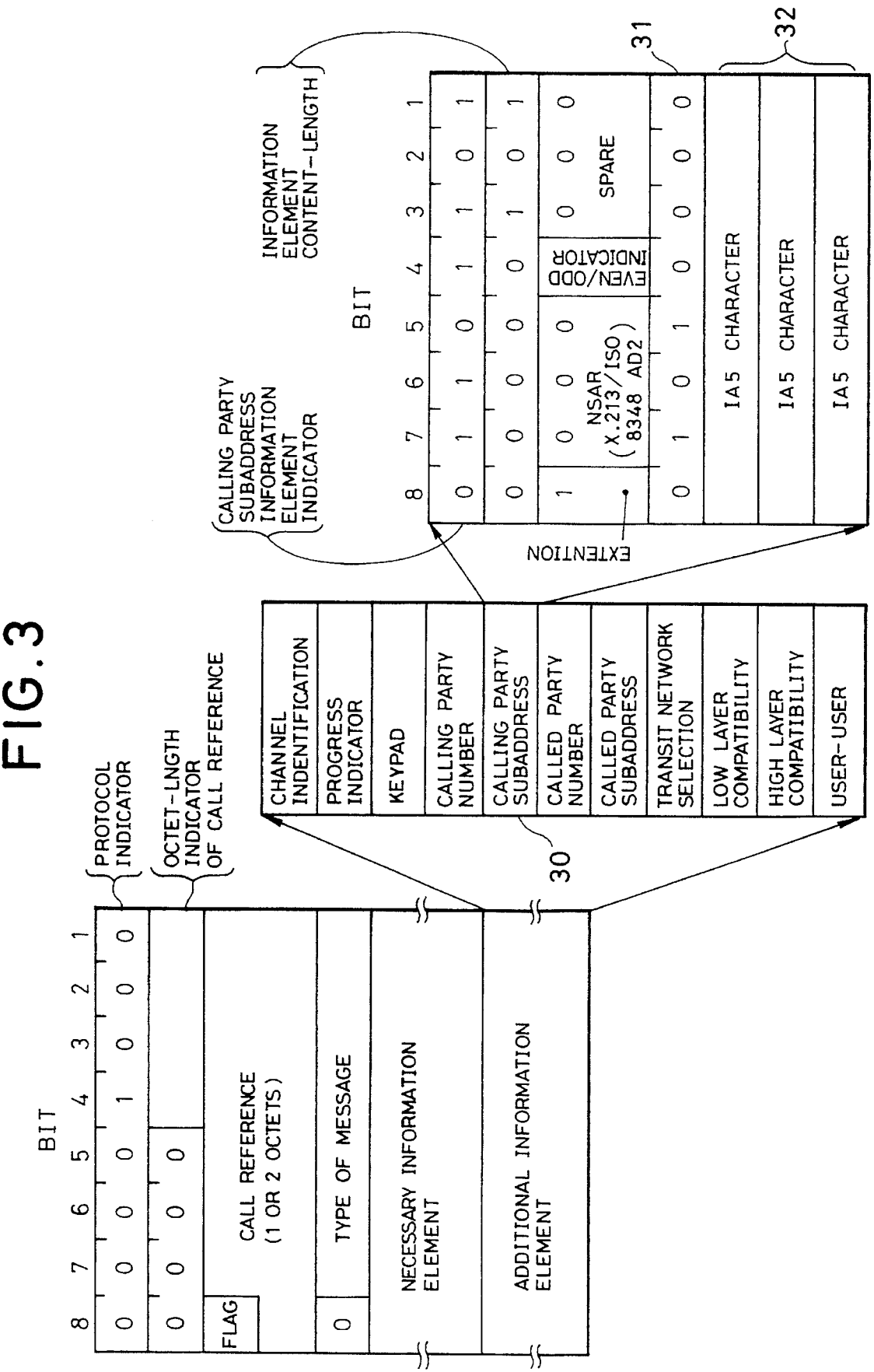

AUTOMATIC CIRCUIT BACK-UP SYSTEM

BACKGROUND OF THE INVENTION

The present invention relates generally to an automatic circuit back-up system for a data communication network. More specifically, the invention relates to an automatic circuit back-up system to be employed in a data communication system including a private communication circuit for data communication and a back-up communication circuit for providing a back-up for the private communication circuit.

Conventionally, such automatic circuit back-up system performs switching a data channel from the private communication circuit to the back-up communication circuit for maintaining data communication when failure of the private communication circuit or a data circuit-terminating equipment (DCE) is detected. In the automatic circuit back-up system, states of the private communication circuit and the data circuit-terminating equipment are constantly monitored. However, back-up circuit condition due to circuit failure caused by breakage of cable or equipment condition, such as failure of the automatic circuit back-up system in a distant office, can be recognized from data back-up operation due to detection of failure in the private communication circuit or the data circuit-terminating equipment, or from connect from the distant office in response to a message for changing or reading of the setting the automatic circuit back-up system in the distant office.

Therefore, if circuit failure in the back-up communication circuit or failure of the automatic circuit back-up system in the distant office is caused upon detection of failure of the private communication circuit or the data circuit-terminating equipment, switching of the data channel from the private communication circuit to the back-up communication circuit cannot be performed. As a result, the reliability of the overall communication system is degraded.

SUMMARY OF THE INVENTION

Therefore, it is an object of the present invention to provide an automatic circuit back-up system which can quickly recognize a failure of a back-up communication circuit due to breakage of a cable or so forth, or failure of the automatic circuit back-up system in a distant office.

Another object of the invention is to provide an automatic circuit back-up system which can improve reliability of the overall data communication system.

In order to accomplish the above-mentioned objects, according to one aspect of the present invention, an automatic circuit back-up system for a data communication system including a private communication line for data communication and a back-up communication circuit for providing a back-up for the private communication circuit, comprises:

periodic message transmitting means for transmitting a periodic message at a predetermined regular period to a distant office through the back-up communication circuit; and monitoring means for monitoring whether the periodic message transmitted from the distant office via the back-up communication circuit is received at the predetermined regular period.

According to another aspect of the invention, an automatic circuit back-up system for a data communication system including a private communication line for data communication and a back-up communication circuit for providing a back-up for the private communication circuit, comprises:

failure detecting means for detecting failure in the private communication circuit and a data circuit-terminating equipment between the intraoffice equipment and the private communication circuit;

data communication circuit switching means responsive to the failure detecting means detecting the failure for switching a data channel from the private communication circuit to the back-up communication circuit;

periodic message transmitting means for transmitting a periodic message at a predetermined regular period to a distant office through the back-up communication circuit; and monitoring means for monitoring whether the periodic message transmitted from the distant office via the back-up communication circuit is received at the predetermined regular period.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is an illustration showing a message format for setup in ISDN.

DESCRIPTION OF THE PREFERRED EMBODIMENT

The preferred embodiment of an automatic circuit back-up system according to the present invention will be discussed hereinafter with reference to the accompanying drawings.

Figure 1:
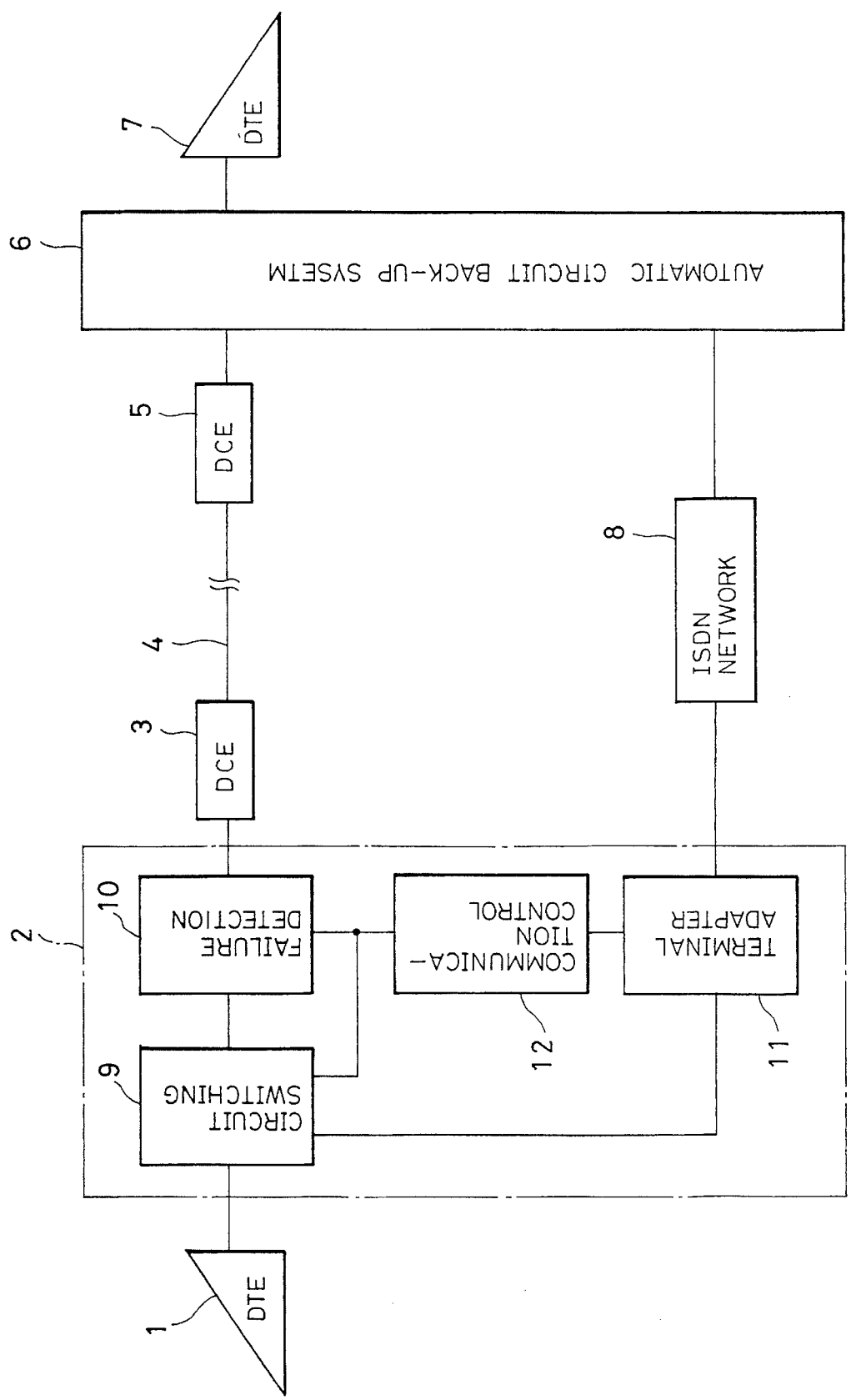
FIG. 1 is a block diagram of the preferred embodiment of an automatic circuit back-up system according to the present invention.

FIG. 1 is a block diagram showing a data communication system employing the preferred embodiment of an automatic circuit back-up system of the invention. The shown embodiment represents a construction for data communication between a data terminal equipment (DTE) 1 in intraoffice and a data terminal equipment 7 in a distant office.

An automatic circuit back-up system 2 according to the present invention and a data circuit-terminating equipment 3 are connected between the data terminal equipment 1 in the intraoffice and a private communication circuit 4. Similarly, in the distant office, an automatic circuit back-up system 6 according to the present invention and the data circuit-terminating equipment 5 are connected between the data terminal equipment 7 and the private communication circuit 4. In addition, for providing a back-up for the private communication circuit 4, an integrated service digital network (hereafter referred to as ISDN) 8. The ISDN 8 is connected between the automatic circuit back-up systems 2 and 6 in the intraoffice and distant office.

The constructions of the automatic circuit back-up systems 2 and are mutually identical. Therefore, in FIG. 1, only construction of the automatic circuit back-up system 2 in the intraoffice is illustrated in detail. As shown, the automatic circuit back-up system 2 includes a circuit switching portion 9 which is responsive to a failure detecting portion 10 detecting a failure to switch a data channel from the private communication circuit 4 to ISDN 8 a back-up communication circuit. The failure detecting portion 10 is adapted to detect failure of the data circuit-terminating equipment 3 and the private communication circuit 4 and to generate a circuit switching command for the circuit switching portion 9 upon detection of failure.

A terminal adapter 11 performs a setup for ISDN 8 in order to perform periodic massaging for the automatic circuit back-up circuit 6 in the distant office. The setup is performed by setting of a telephone number of the intraoffice in a calling party number area in a calling control information and by setting of information necessary for periodic massaging in a calling party subaddress information area. Of course, the terminal adapter 11 is also provided with a known function for signal conversion of data for the ISDN 8.

A communication control portion 12 is adapted to perform reception monitoring for the periodic message from the automatic circuit back-up system 6 in the distant office arriving through the ISDN 8 and performs discrimination of the periodic message on the basis of information in the calling party subaddress information area in the calling control information in the ISDN 8.

Data from the data terminal equipment 7 in the distant office is modulated by the data circuit-terminating equipment 5 connected to the automatic circuit back-up system 6 and reaches the data circuit-terminating equipment 3 through the private communication circuit 4 as data channel. The data is demodulated by the data circuit-terminating equipment 3 and then reaches the data terminal equipment 1 in the intraoffice via the automatic circuit back-up system 2.

In the automatic circuit back-up device 2, the state of the private communication circuit 4 or the state of the data circuit-terminating equipment 3 is constantly monitored by the failure detecting portion 10 so that the data channel can be automatically switched from the private communication circuit 4 to the ISDN 8 as the back-up communication circuit by the circuit switching portion 9 when the failure is detected.

In the shown embodiment, the automatic circuit back-up system performs the conventionally known regular monitoring of the circuit condition of the private communication circuit 4 and the equipment conditions of the data circuit-terminating equipment 3 and 5. In addition, the automatic circuit back-up system 2 in the intraoffice performs monitoring of the circuit condition of the ISDN 8 and the equipment condition of the automatic circuit back-up system 6 in the distant office by periodically receiving the periodic message at a regular interval from the automatic circuit back-up system 6 in the distant office.

Figure 2:
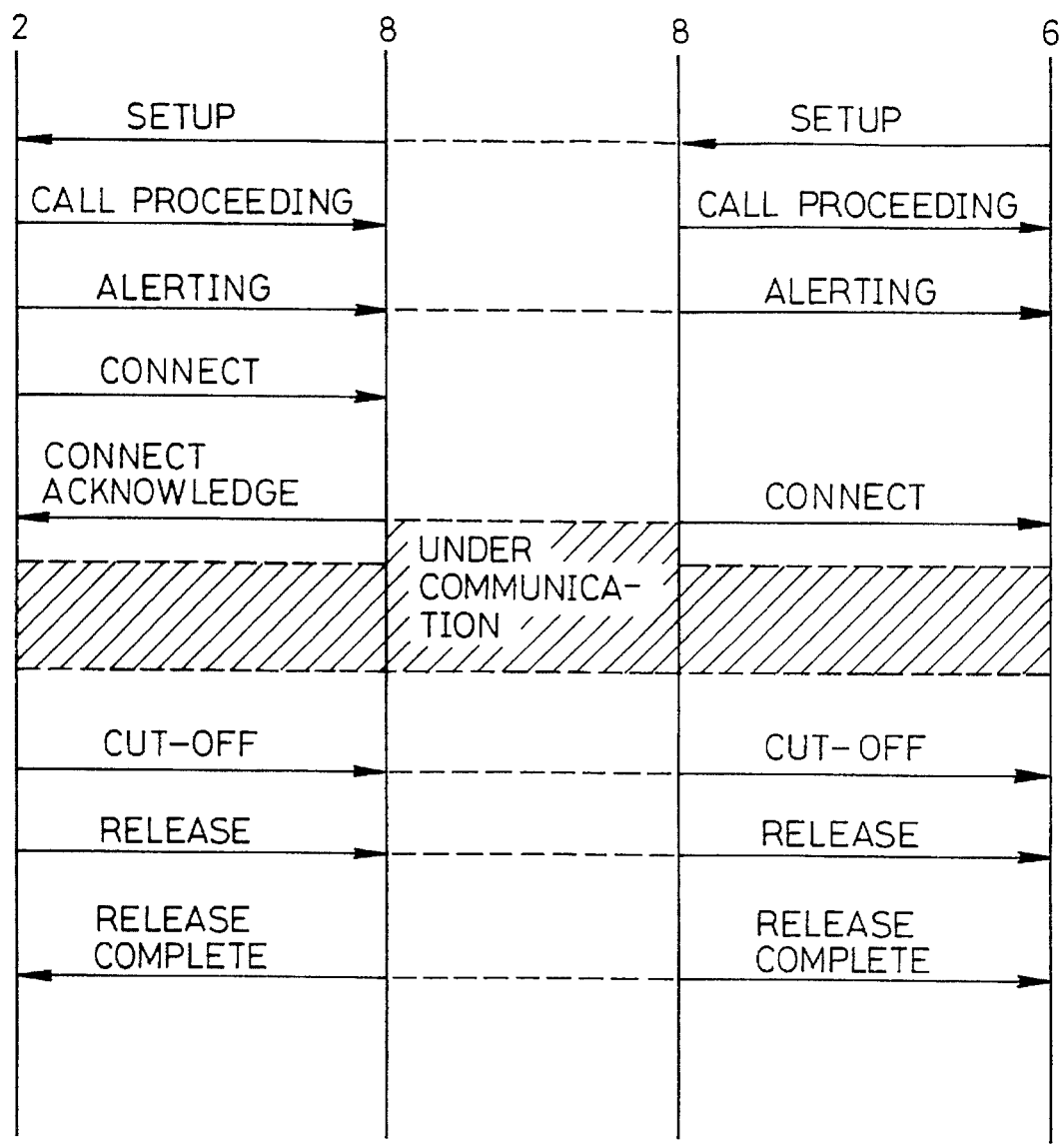
FIG. 2 is a chart showing a manner of calling control of an integrated service digital network (ISDN) for periodic message in the preferred embodiment of the invention.

The periodic massaging is realized by a calling control process in the ISDN 8 as illustrated in FIG. 2. The automatic circuit back-up system 8 in the distant office performs setup for ISDN 8 using the terminal adapter 11 which performs calling control in the ISDN 8, in order to transmit the periodic message to the automatic circuit back-up system 2 in the intraoffice. In the setup, the telephone number of the intraoffice is set in the calling party number information area as the information for setup and the information necessary for the periodic message is set in the calling party subaddress information area.

FIG. 3 shows a message format for setup in ISDN. "RN1" is set in an IA5 character 32 following a calling party address format indicator (AFI) 31 of the calling party subaddress information area 30 of this message format. It should be noted that "RN" indicates the periodic message and "1" indicates the identification number of the distant office 6.

The setup information is received by the terminal adapter 11 in the automatic circuit back-up system 2 in the intraoffice via the ISDN 8 serving as the back-up communication circuit. The communication control portion 12 discriminates the calling party subaddress information in the setup information between that for periodic message, for back-up and for changing setting. If "RN1" in the IA5 character 32 is detected, judgement can be made that the received message is the periodic message from the apparatus having the identification number "1". Between the automatic circuit back-up systems in the intraoffice and the distant office, a sequence of calling control processes of call proceeding, alerting, connect, cutting-off and is performed for realizing each time of periodic massaging operation.

Since the periodic message is transmitted from the automatic circuit back-up system 6 in the distant office at regular interval, the automatic circuit back-up system 2 recognizes that the ISDN 8 as the back-up circuit or the automatic circuit back-up system 6 of the distant office to take a measure for failure when the periodic message is not received at a given timing after reception of the periodic message.

With this periodic massaging function, the circuit condition of the communication back-up circuit and the equipment condition of the automatic circuit back-up system 6 in the distant office can be easily recognized by the automatic circuit back-up system 2 in the intraoffice. Therefore, it becomes possible to quickly take a measure. Furthermore, since quick measure for the back-up circuit failure, such as breakage of the cable or for equipment failure of the automatic circuit back-up system in the distant office will improve realizability of the communication system.

Here, the failure detecting operation of the failure detecting portion 10 is discussed. Assuming that the interface of the data terminal equipment is "RS232C, the data circuit-terminating equipment 3 generates a CD signal indicative that a carrier signal is received from the data circuit-terminating equipment 5. Accordingly, the failure portion 10 monitors this CD signal and makes judgement of failure when the CD signal is turned OFF from ON. Then, the failure detecting portion 10 commands establishing of a back-up route via ISDN 8 to the communication control portion 12 and to commands switching to the circuit switching portion 9. When the CD signal turns ON from OFF, judgement is made that the failure is recovered to command switching to the circuit switching portion 9 and to command releasing of back-up route to the communication control portion 12.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An automatic circuit back-up system for a data communication system, including a private communication line for data communication, a back-up communication line, and back-up communication circuits, with one back-up communication circuit located at a local office and one back-up communication circuit located at a distant office, each of said back-up circuits providing a back-up for said data communication system comprising:

periodic message transmitting means located at said distant office for periodically transmitting a message at a predetermined regular period to said local office through said backup communication circuit; and monitoring means for monitoring whether said periodically transmitted message from said periodic message transmitting means at said distant office via said back-up communication circuit is received at said predetermined regular period, wherein a lack of detection of said periodically transmitted message indicates a possible failure of either said distant office back-up communication circuit or of said back-up communication line.

2. An automatic circuit back-up system as set forth in claim 1, wherein said back-up communication circuit is an integrated service digital network.

3. An automatic circuit back-up system as set forth in claim 2, wherein said periodic message transmitting means comprises a terminal adapter for calling control in the integrated service digital network and for signal conversion of data for the integrated service digital network.

4. An automatic circuit back-up system as set forth in claim 3, wherein information necessary for said period message is transmitted by setting in a calling party subaddress information area in a calling control information.

5. An automatic circuit back-up system located at a local office for a data communication system, including a private communication line for data communication, a back-up communication line, and back-up communication circuits, with one back-up communication circuit located at a local office and one back-up communication circuit located at a distant office, each of said back-up circuits providing a back-up for said data communication system, said system comprising:

failure detecting means for detecting either a failure in said private communication line, or a failure in a data circuit-terminating equipment, said data circuit-terminating equipment being located between equipment located at said local office and said private communication line;

data communication circuit switching means, said switching means being responsive to said failure detecting means detecting a failure, said switching means allowing for switching a data channel from said private communication line to said local office back-up communication circuit;

periodic message transmitting means for periodically transmitting a message at a predetermined regular period to said distant office back-up communication circuit; and monitoring means for monitoring whether a message periodically transmitted from said distant office back-up communication circuit is received at a predetermined regular period, wherein a lack of detection of said message periodically transmitted from said distant office indicates a possible failure of either said distant office back-up communication circuit or of said back-up communication line.

6. An automatic circuit back-up system as set forth in claim 5, wherein said back-up communication circuit is an integrated service digital network.

7. An automatic circuit back-up system as set forth in claim 6, wherein said periodic message transmitting means comprises a terminal adapter for calling control in the integrated service digital network and for signal conversion of data for the integrated service digital network.

8. An automatic circuit back-up system as set forth in claim 7, wherein information necessary for said period message is transmitted by setting in a calling party subaddress information area in a calling control information.

* * * * *